Figure 1:
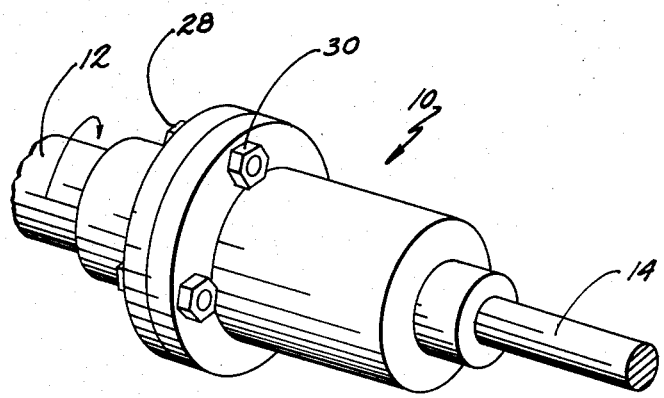

Sept. 1, 1964  E. L. LORENZ  3,146,612
COUPLING
Filed Feb. 1, 1963

INVENTOR.
ELDON L. LORENZ
BY
ATTORNEYS

United States Patent Office 3,146,612
Patented Sept. 1, 1964

---

3,146,612
COUPLING
Eldon L. Lorenz, Grand Rapids, Mich., assignor to Michigan Wheel Company, Grand Rapids, Mich., a corporation of Michigan
Filed Feb. 1, 1963, Ser. No. 255,527
2 Claims. (Cl. 64—11)

This invention relates to a drive shaft coupling for an inboard engine boat to connect the power output shaft of the engine to the propeller shaft.

The drive train assembly from the engine of an inboard engine boat conventionally includes an engine output shaft, an automatic clutch to allow gear shifting, a gear box, and a propeller shaft extending through the boat for attachment of a propeller. The complex automatic clutch assembly is elaborate and expensive, to cause smooth shifting of gears without jerking or clashing of gear teeth. Moreover, during assembly, the shafts must be exactly and carefully aligned or else (1) resulting bearing wear becomes severe, (2) the connections tend to howl or whine, and (3) the misalignment creates a vibrational effect throughout the boat. The result is a loss of power, rapid bearing wear and unpleasant vibration and noise. Since the engine is mounted on rubber engine mounts, it, as well as its output power shaft, normally has a vibratory movement during operation. This also creates constant alignment problems over the life of the boat.

In addition to these factors, the conventional drive train is placed under severe torsional stress and can fail if the propeller strikes an object under water. The tremendous rotational torque applied to the shaft to drive the boat is immediately countered by the stopping torque of the object, thereby causing twisting of the shaft, breakage of the propeller blades, and/or usually misalignment of the shaft assembly. Repairs can be extensive and costly in such a situation.

It is therefore an object of this invention to provide a power shaft coupling for an inboard engine boat that eliminates the requirement of an elaborate and expensive automatic clutch. It provides a resilient frictional slip coupling removing the major part of the jerking effect when shifting gears. A simple, inexpensive clutch can therefore be used with it. Further, if the propeller strikes an object, the engine output shaft can continue to rotate without stress until the object is cleared. The coupling also automatically accommodates misalignment between the engine output shaft and the propeller shaft, whether this misalignment is initially created during assembly, or created during the life of continued operation of the boat. Even though the engine is mounted on rubber mounts and moves about in a vibrational manner during operation, the coupling readily accommodates this constant varied misalignment without any resultant howl, whine, bearing wear or vibration. Even under these conditions, it continues to operate quietly and effectively. The coupling can be readily attached to a conventional drive shaft assembly quickly and easily, and may be removed just as readily.

Figure 2:
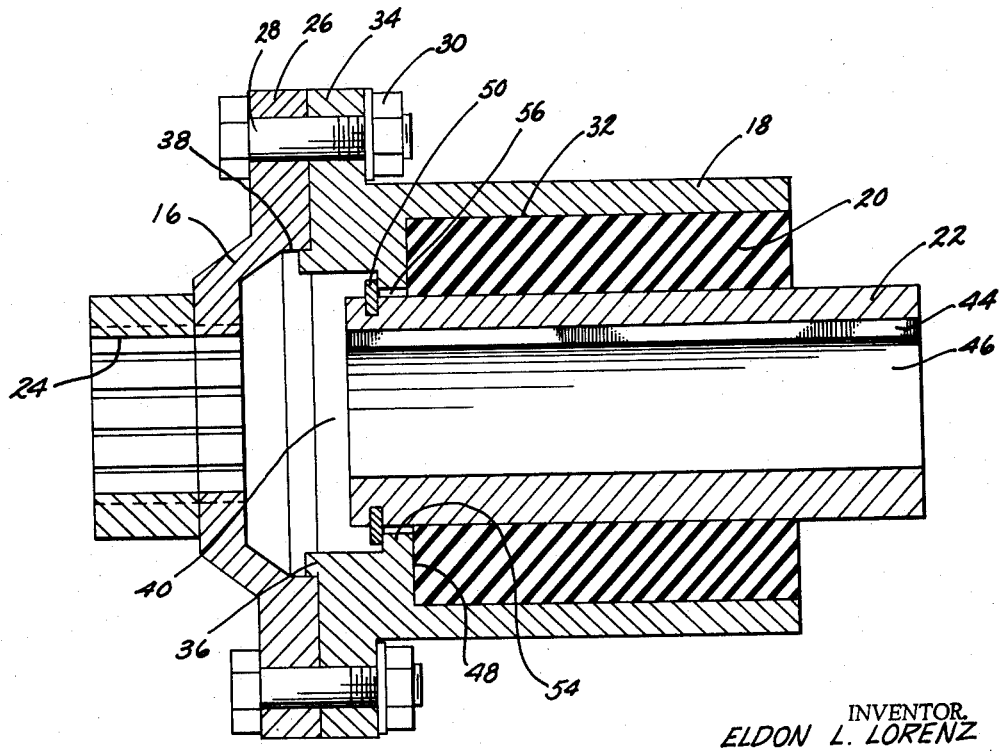

These and several objects of this invention will be apparent upon studying the following specification in conjunction with the drawings in which:

FIG. 1 is a fragmentary perspective view showing the novel coupling in position mounted in a boat; and FIG. 2 is a side elevational sectional view of the assembled coupling.

The inventive drive shaft coupling will be understood more specifically with reference to the drawings. The coupling 10 is intended to be mounted in an inboard engine boat, between the engine output drive shaft 12 and the propeller shaft 14. The drive train assembly also includes a simple clutch, a gear box, and a propeller (not shown), the latter being mounted on the end of the propeller shaft 14. This drive coupling includes four main components, namely, drive plate 16, collar housing 18, resilient bushing 20, and output sleeve 22.

Plate 16 includes a central splined socket 24 to receive the splined end of engine output power shaft 12 from the internal combustion engine (not shown). It also includes a radially extending rim 26 having openings spaced around the periphery for reception of bolts 28 to which nuts 30 are attached, forming removable connector means.

Adjacent and abutting rim 26 of plate 16 is the axial face of the flange 34 of collar 18. The collar also has an inner cylindrical surface 32 on the end opposite radially-extending flange 34. Flange 34 includes openings through which the bolts 28 protrude for connection to plate 16. An inner annular axially extending rib 36 on the axial face of flange 34 fits within the cylindrical pocket 38 of plate 16 to align these two components for connection. The plate and collar together define an inner chamber 40 formed by pocket 38 and an adjacent pocket in the collar element.

Bushing 20, of a suitable resilient material having frictional characteristics, is preferably made of a rubber such as neoprene. It is vulcanized to the outer periphery of the annular elongated sleeve 22. It forms a tight frictional engagement with cylindrical surface 32 of the collar when axially interfitted therewith. Sleeve 22 has an inner socket 46 having an axial keyway 44 to form a rotational driving engagement with the propeller shaft 14. Sleeve 22 and bushing 20 are axially retained in collar 18, with the front surface of the bushing abutted against the face 48 of the collar, by a conventional snap ring 50 interfitting in a groove formed in the outer periphery of the inner end of the sleeve, and abutting the radially inwardly protruding shoulder 54 on the collar. A definite clearance 56 of several thousandths of an inch is provided between the inner diameter of this shoulder 54 and the outer diameter of sleeve 22.

To assemble the structure, plate 16 is first axially forced onto the rear end of the engine output shaft 12. Next, sleeve 22 and bushing 20 are forced axially within cylindrical surface 32 until the front end of the bushing abuts the face 48 of the collar. Snap ring 50 is then placed in the annular groove provided for it on the sleeve so as to engage shoulder 54 and retain the sleeve and bushing into axial engagement with the collar. Sleeve 22 is then axially placed upon shaft 14 with a key in place in keyway 44 to provide rotational engagement therewith. Next, flange 34 and plate 16 are abutted and aligned with rib 36 inside the corresponding cylindrical surface of pocket 38. Bolts 28 are inserted through the abutting rim 26 of plate 16 and flange 34 of collar 18, and nuts 30 are tightened in place. The unit is then ready for operation. Even if the bearings (not shown) mounting the shafts are not in exact alignment, both axially and angularly, the resilient drive connection provides a quiet, efficient, and effective driving connection between the engine and propeller protruding from the rear of the boat. Thus, the usual special care required to provide exact alignment both axially and angularly of the drive train is not crucial. Further, with constant minor misalignment that occurs between the vibrating engine mounted on rubber mounts, and the propeller shaft, the coupling merely absorbs and constantly accommodates this relative movement, to prevent howl or whine of the assembly. This is so because bushing 20 may be slightly tilted or shifted with respect to its cylindrical engaged surface 32 without interrupting the quiet drive connections. The clearance 56 allows this action between the sleeve collar.

If, during operation, the propeller should strike a solid object beneath the water, so that sleeve 22 is immediately and abruptly stopped, this does not impose severe strain on any of the components of the drive train, since the frictional engagement between bushing 20 and cylindrical surface 32 of collar 18 allows temporary slippage until the obstacle is no longer encountered.

Thus, there is provided a coupling connection for inboard engine boats, which removes the necessity for expensive clutches, removes the necessity for exacting alignment during assembly of the drive train, and eliminates large repair expenses and the nuisance of damaged components of the drive train when a solid object is struck by the propeller.

Certain obvious structural modifications incorporating the principles of this invention may be apparent to those in the art upon studying the foregoing illustrated form of the invention. These obvious modifications are deemed to be part of this invention, which is to be limited only by the scope of the appended claims, and the reasonably equivalent structures to those defined therein.

I claim:

1. A drive shaft coupling for connecting the drive shaft to the propeller shaft in the drive train of an inboard engine boat, comprising: a plate having a central splined socket for engaging an engine output power shaft; an axially extending collar having a radially extending flange abutting said plate; an inner cylindrical surface in said collar; removable connecting means between said plate and said flange; an elongated cylindrical sleeve extending into said collar and having an internal key means for engaging the propeller shaft of said boat; a resilient bushing on said sleeve having a cylindrical outer surface frictionally engaging said inner cylindrical surface to normally provide a driving connection therebetween but allow slippage therebetween if said propeller shaft and sleeve are stopped; said collar having a radially inwardly extending inner shoulder around said sleeve; a radially outwardly extending snap ring on said sleeve, having an outside diameter smaller than the inside diameter of said shoulder, and axially engaging said shoulder opposite said bushing to secure said sleeve and bushing axially in said collar; and said cylindrical sleeve having an outer diameter smaller than the inner diameter of said shoulder and being spaced therefrom to leave a clearance therebetween, allowing compensation for misalignment between said shafts by tilting of said bushing on said inner cylindrical surface while retaining the drive connection therebetween.

2. A drive shaft coupling for connecting the drive shaft to the propeller shaft in the drive train of an inboard engine boat adapted to be attached to the drive plate on the power output shaft of the boat, comprising: an axially extending collar having a radially extending flange abutting said plate; an inner cylindrical surface in said collar; removable connecting means between said plate and said flange; an elongated cylindrical sleeve extending into said collar and having an internal key means for engaging the propeller shaft of said boat; a resilient bushing on said sleeve having a cylindrical outer surface frictionally engaging said inner cylindrical surface to normally provide a driving connection therebetween but allow slippage therebetween if said propeller shaft and sleeve are stopped; said collar having a radially inwardly extending inner shoulder around said sleeve; a radially outwardly extending removable connector secured to said sleeve, having an outer diameter larger than the inner diameter of said shoulder, and axially engaging said shoulder opposite said bushing to retain said sleeve and bushing axially in said collar; and said sleeve having a sufficiently larger diameter than said shoulder to leave a clearance therebetween, allowing compensation for misalignment between said shafts by tilting of said bushing on said inner cylindrical surface, while retaining the drive connection therebetween.

References Cited in the file of this patent

UNITED STATES PATENTS

| | | |
|---|---|---|
| 1,649,426 | Van Ranst | Nov. 15, 1927 |
| 2,687,045 | Schroeder | Aug. 24, 1954 |
| 2,751,987 | Kiekhaefer | June 26, 1956 |
| 2,962,312 | Wanner | Nov. 29, 1960 |